Feb. 17, 1942.  L. J. TUCK  2,273,160
MEAT BLOCK RESURFACING MACHINE
Filed Feb. 14, 1940
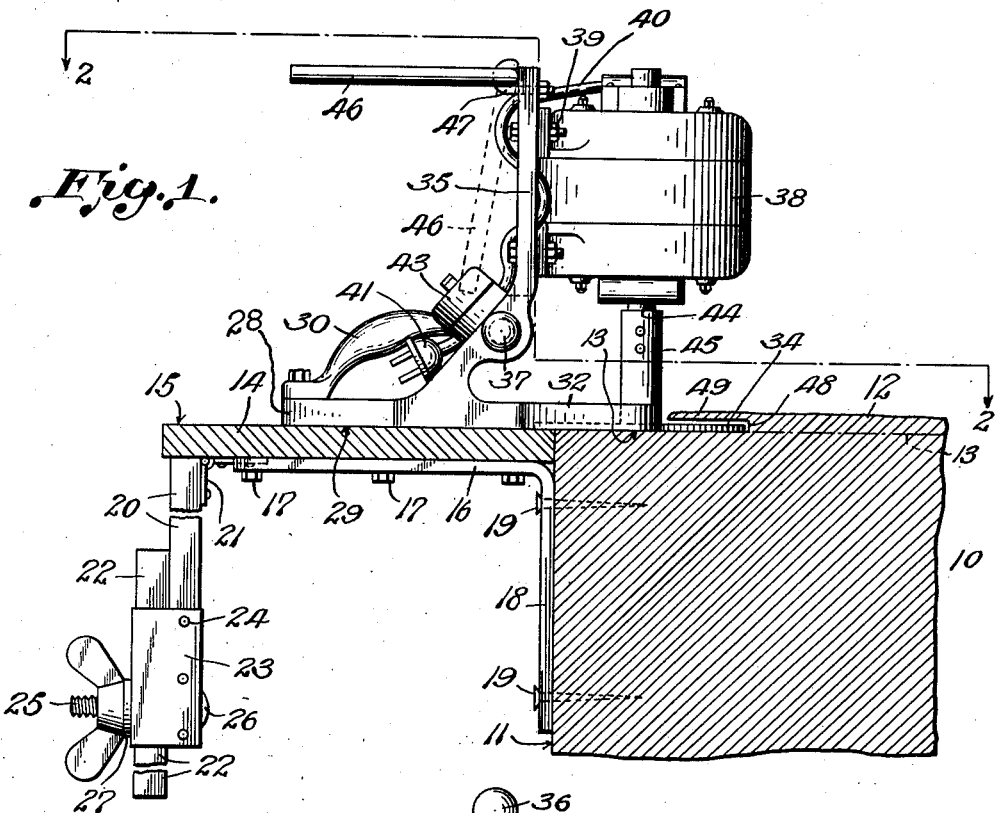
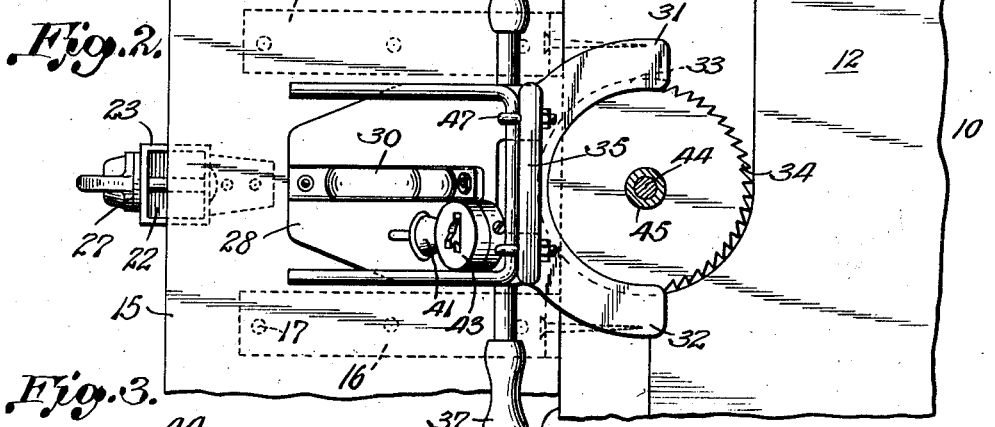
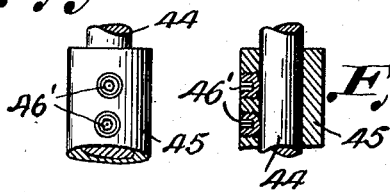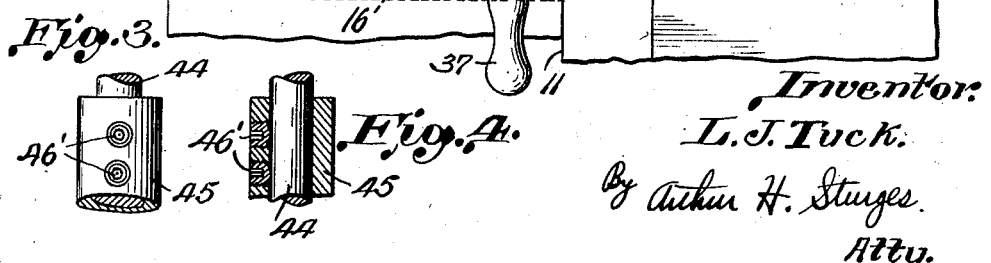
Inventor:
L. J. Tuck.
By Arthur H. Sturges.
Atty.

Patented Feb. 17, 1942

2,273,160

UNITED STATES PATENT OFFICE 2,273,160

MEAT BLOCK RESURFACING MACHINE

Leo J. Tuck, Denver, Colo.

Application February 14, 1940, Serial No. 318,889

1 Claim. (Cl. 144—2)

This invention relates to the art of cutting and slicing meat and more particularly to butcher's meat blocks.

It is an object of the invention to provide a means for resurfacing the upper surface of a butcher's meat block upon which meats are chopped, cut and the bones thereof severed by saws.

Another object of the invention is to provide a device for the above stated purpose which may be readily attached to a meat block for resurfacing the latter and without the necessity of transporting a heavy meat block to a saw mill as heretofore practiced.

Other and further objects and advantages of the invention will be understood from the following detailed description thereof, reference being had to the accompanying drawing in which:

Figure 1 is a vertical section of a fragment of a meat block with an embodiment of the present invention attached thereto in a position of use.

Figure 2 is a top plan view thereof partly in section taken on line 2—2 of Figure 1.

Figure 3 is an elevation of a fragment of a saw carrying sleeve employed.

Figure 4 is a transverse section of the sleeve shown in Figure 3.

It is well known that butcher's blocks accumulate grease and fat thereon during the cutting of meats, whereby it is necessary or customary at the end of each day of use to scrape the surfaces thereof for removing said meat grease, said continuous scraping being necessary for sanitary purposes and soon providing the block with an uneven contour. Also resultant from use particularly from cleavers which cut into the surfaces of meat blocks interstices become formed in the vertically disposed grain of the wood thereof which become filled with bacteria, germs or debris, the latter working into the interior of the block beyond removal by scrapers and steel brushes used by butchers for cleaning thick blocks. At times when said surfaces become unduly uneven it is not only unsanitary but also militates against a proper cutting of meat, particularly at times when a butcher lays a lengthy loin of pork or the like upon an uneven surface for cutting chops the latter vary in thickness since the sides of a chop so cut will converge towards each other in lieu of being in parallelism as desired and the present invention contemplates a provision of means for obviating undesirable prior practices.

Referring now to the drawing for a more particular description 10 indicates generally a butcher's meat block having a side 11 disposed at a right angle with respect to the initial upper surface thereof. The worn removable surface 12 of the block 10 is disposed above the new surface indicated at 13, the latter being provided by employment of the present invention as later described.

In order to provide the new surface 13 a platform 14 having a smooth surface 15 is first disposed as shown in Figure 1. The platform 14 preferably consists of a board formed of hard wood having a length equal to the width of the top of the block 10. To that side of the platform 14 which is opposite with respect to the surface 15 preferably two spaced apart corner irons are secured thereto by means of lag screws or the like keepers 17.

The corner irons 16 are each provided with an arm 18 disposed at a true right angle with respect thereto. The arms of the corner irons are removably secured to the block 10 by means of screws 19 which are later removed after the block 10 has been resurfaced.

At times when the later described device is comparatively heavy for resurfacing large blocks a leg support 20 is secured to the platform 13 by means of a hinge 21. The leg 20 is provided with an extension or extensible portion 22 which is slidably disposed through a guide 23, the latter being secured to the leg 20 by means of screws or the like 24. The extension 22 is provided with an elongated slot through which a bolt 25 is disposed, the head 26 of said bolt being disposed against said guide. A wing nut and washer assembly is carried by the shank of the bolt 25 and it will be understood that said wing nut may be tightened for clamping the extension 22 to the leg 20 for providing a leg of an adjustable length whereby the lower end of the extension 21 may extend to the floor of the room upon which said block is disposed and the outer edge of the platform 14 be supported by said leg. For ordinary uses the leg 20 may be dispensed with if desired.

The meat block 10 is provided with legs which rest upon the said floor, said legs not being shown and it will be understood that an average weight for a butcher's meat block is substantially five hundred pounds whereby it is not convenient to remove the same to a saw mill for a resurfacing thereof. In combination with the platform 10 the new device includes a frame 28 having a flat smooth bottom 29. A handle 30 is provided on the rear end of the frame primarily for transporting the device. The forward portion of the frame is bifurcated providing oppositely disposed wings 31 and 32, said wings being provided with an arcuate step cut recess 33 within which about one half of the teeth of a cutting saw 34 are disposed.

A standard 35 is preferably formed integral with the frame and extends therefrom at a true right angle with respect to the smooth bottom 29. Oppositely disposed service handles 36 and 37 are carried by the standard adjacent the lower end thereof. An electric motor 38 is secured to the standard 35 by a suitable means such as the bolts 39. A cord 40 is employed, said cord being provided with two electric wires insulated with respect to each other which extend through the cord, said wires having ends respectively secured to the opposite binding posts of the motor 38. The other ends of said wires are secured to an electric push-in plug 41 and also each said wire is secured to and in contact with one of the electrodes of said push-in plug whereby the motor is adapted to be connected to power wires for energizing and driving said motor. A switch 43 is carried by and secured to the standard 35 and is included in any electrical circuit which includes the wires of the cord 40.

The shaft 44 of the motor 38 receives a sleeve 45 which, as best shown in Figures 3 and 4, is provided with one or more set screws 46' for attaching the sleeve to the shaft 44. An end of the sleeve 45 is secured to the heretofore mentioned saw 34, the latter being axially disposed with respect to the sleeve 45 and motor 38.

The device further preferably includes a rest 46 which, as best shown in Figure 2, is C-shaped in plan and formed of rod, said rest being pivotally secured to the upper end of the standard 35 by means of U-bolts 47 whereby the rest 46 may be disposed in the full line position thereof as shown in Figure 1, or moved to the dotted line position thereof as shown in said figure.

During use of the apparatus the rest 46 is preferably disposed in the dotted line position thereof and at times when it is desired to up set the device for holding the teeth of the saw 34 away from an object for protecting said teeth the motor is disposed in an upward position whereby the outer ends of the rest 46 engage against a flat surface for said purpose.

In operation and assuming that the platform 14 has been secured to the side 11 of the block 10 as heretofore described the bottom 29 of the frame 28 is disposed upon the smooth surface 15 of the platform 14 and at this time the saw 34 is disposed away from the block 10; whereupon and assuming that the same is rotating and the operator is standing behind the platform 14 and adjacent to the leg 20 he then grasps the handles 36 and 37 and moves the saw against the block 10 at one side of said block and thus moves the saw away from himself until the saw has entered the block a distance substantially equal to the diameter of the saw whereupon he then moves the saw longitudinally of the platform 14 thereby cutting a slot 48 in the top of the block, as shown in Figure 1. The overhanging portion 49 of the block which is disposed at one side of the slot 47 is readily removed by striking the same with a hammer or the like; whereupon the operation is repeated, the frame 28 becoming disposed entirely upon the block and resting upon the new surface 13 thereof. Further advance of the saw and repetition of the operation provides a new surface for the entire top of the block without removal of the latter from its initial or usual place of use. As thus described a block may be resurfaced rapidly, economically and without the use of skilled labor.

From the foregoing description it is thought to be obvious that a meat resurfacing machine constructed in accordance with my invention is particularly well adapted for use by reason of the convenience and facility with which it may be adapted and operated, and it will also be obvious that my invention is susceptible of changes and modifications which come within the scope of the claim.

I claim:

A device for use in resurfacing a butcher's block comprising a frame provided with a flat bottom, a standard carried by said frame having a handle disposed at each side thereof for guiding said frame over said block, an electric motor so secured to said standard that its shaft is disposed at a right angle with respect to said bottom, a circular saw having one of its sides disposed in alignment with said bottom, a collar having an end axially secured to the other side of said saw, means for attaching the other end of said collar axially to said shaft, said frame being provided with wings constituting a guard adjacent said bottom, said guard being disposed over teeth of said saw adjacent said handles for preventing contact of an operator's hands with said teeth during resurfacing operations.

LEO J. TUCK.